United States Patent
Houri et al.

(10) Patent No.: US 9,226,224 B1
(45) Date of Patent: Dec. 29, 2015

(54) METHOD AND SYSTEM FOR OBTAINING INFORMATION ABOUT WI-FI ENABLED TELECOMMUNICATIONS DEVICES

(71) Applicant: Mexens Intellectual Property Holding LLC, Miami Beach, FL (US)

(72) Inventors: Cyril Houri, Miami Beach, FL (US); Gianni Giorgetti, San Diego, CA (US)

(73) Assignee: Vortex Intellectual Property Holding LLC, Miami Beach, FL (US)

( * ) Notice: Subject to any disclaimer, the term of this patent is extended or adjusted under 35 U.S.C. 154(b) by 121 days.

(21) Appl. No.: 13/868,723

(22) Filed: Apr. 23, 2013

Related U.S. Application Data

(60) Provisional application No. 61/637,084, filed on Apr. 23, 2012.

(51) Int. Cl.
*H04W 72/04* (2009.01)
*H04W 48/16* (2009.01)

(52) U.S. Cl.
CPC .................................... *H04W 48/16* (2013.01)

(58) Field of Classification Search
USPC ............ 455/456.1–457; 705/14.41–14.73, 80
See application file for complete search history.

(56) References Cited

U.S. PATENT DOCUMENTS

| | | | |
|---|---|---|---|
| 7,778,186 B2 * | 8/2010 | Oman et al. | 340/5.61 |
| 8,180,371 B1 * | 5/2012 | Izdepski et al. | 455/456.1 |
| 8,595,070 B1 * | 11/2013 | Barnes et al. | 705/14.64 |
| 2012/0316940 A1 * | 12/2012 | Moshfeghi | 705/14.16 |

* cited by examiner

*Primary Examiner* — Shripal Khajuria
*Assistant Examiner* — Sasha Cintron Pacheco
(74) *Attorney, Agent, or Firm* — Brian Roffe

(57) ABSTRACT

Method, system and computer program for obtaining information about telecommunications devices that transmit signals seeking available Wi-Fi connectivity. One or more Wi-Fi beacons are configured to detect probing signals from any telecommunications device in its range, a processor at each Wi-Fi beacon extracts an identifier of each telecommunications device from detected probing signals and each Wi-Fi beacon is associated with the identifier of any telecommunications devices whose probing signals have been received by that Wi-Fi beacon to thereby determine the presence and optionally position of any telecommunications devices within the range of the Wi-Fi beacon. The telecommunications devices are not involved in the method other than providing in their usual manner of operation, probing signals containing identifiers.

15 Claims, 5 Drawing Sheets

METHOD AND SYSTEM FOR OBTAINING INFORMATION ABOUT WI-FI ENABLED TELECOMMUNICATIONS DEVICES

CROSS-REFERENCE TO RELATED APPLICATION

This application claims priority of U.S. provisional patent application Ser. No. 61/637,084 filed Apr. 23, 2012, which is incorporated by reference herein.

FIELD OF THE INVENTION

The present invention relates generally to a method, system and computer program used in connection with a Wi-Fi beacon that listens to signals being transmitted by cellular telephones, smartphones and other portable telecommunications devices with Wi-Fi connectivity, and determines the presence and optionally position of such devices in a range of the beacon.

The present invention also relates to several methods, systems and computer programs for using the information about the presence and optionally location of cellular telephones, smartphones and other portable telecommunications devices obtained by the Wi-Fi beacon. The information may be used to control mechanical and electrical systems, such as a gate or door regulating mechanism, and/or to control an electronic system, such as a transmission or communications unit that directs general or customized messages, texts and the like to one or more of the detected telecommunications devices.

BACKGROUND OF THE INVENTION

Cellular telephones, smartphones and other portable telecommunications devices that utilize Wi-Fi generate probing signals that enable each device to link with a Wi-Fi beacon when in range of the beacon. This characteristic of telecommunications devices has been applied in a product and service using the trademark Navizon® wherein the device is provided with an application that monitors the presence of nearby Wi-Fi beacons.

SUMMARY OF THE INVENTION

The present invention relates to a method, system and computer program for obtaining information about one or more telecommunications devices that transmit signals seeking available Wi-Fi connectivity. In the method, one or more Wi-Fi beacons are configured to detect probing signals from any telecommunications device in its defined range, a processor at or associated with each Wi-Fi beacon extracts an identifier of each telecommunications device in the defined range from detected probing signals and each Wi-Fi beacon is associated with the identifier of any telecommunications devices whose probing signals have been received by that Wi-Fi beacon to thereby determine the presence and optionally position of any telecommunications devices within the range of the Wi-Fi beacon. The telecommunications devices are not involved in the method other than providing, in their usual manner of operation, probing signals containing identifiers.

Added features include determining, at one or more of the Wi-Fi beacons, a position of a telecommunications device whose probing signal has been detected by that Wi-Fi beacon. This may be accomplished by approximating the position of the telecommunications device relative to the Wi-Fi beacon based on strength of the probing signal. Alternatively, it may be accomplished by approximating the absolute position of the telecommunications device based on strength of the probing signal detected by the Wi-Fi beacon and a known position of the Wi-Fi beacon. Once the position of one or more of the telecommunications device is known, it is possible to generate a map of an area within range of the Wi-Fi beacons on a display or a plurality of displays, and indicate the position of the telecommunications device on the map.

Movement of the telecommunications device can be monitored by analyzing variations in strength of the probing signals being detected by the Wi-Fi beacons, or changes in position of the telecommunications device determined as mentioned above.

One or more devices may be independently or dependently controlled based on the determined presence and optionally position of any telecommunications devices within the range of at least one of the Wi-Fi beacons. For example, the device may be an entry control mechanism that unlocks, opens, closes and/or locks a gate or door based on the presence of a particular telecommunications device or devices within a predetermined range.

In one embodiment, at least one of the Wi-Fi beacons is installed at or proximate a commercial establishment (e.g., a store), and a general or customized message containing an advertisement or coupon relating to the commercial establishment is directed to at least one detected telecommunications device within the range of that Wi-Fi beacon.

In another embodiment, a number of telecommunications devices passing in a vicinity of at least one of the Wi-Fi beacons in a set time period may be detected by determining a number of non-repeating identifiers of telecommunications devices whose probing signals are detected by that Wi-Fi beacon.

It is also possible to use an embodiment of the invention to assess efficacy of advertising for a physical establishment by placing a first one of the Wi-Fi beacons in a vicinity of an advertisement for the establishment, creating a database of identifiers of telecommunications devices whose probing signals are detected by the first Wi-Fi beacon, placing a second one of the Wi-Fi beacons in or in a vicinity of the establishment, and analyzing whether identifiers of telecommunications devices whose probing signals are detected by the second Wi-Fi beacon have been previously detected by the first Wi-Fi beacon.

It is also possible to monitor crowds in a defined area by arranging one or more of the Wi-Fi beacons to detect probing signals originating from telecommunications devices in the defined area and analyzing a number of people in the defined area by determining a number of non-repeating identifiers of telecommunications devices whose probing signals are detected by the one or more of the Wi-Fi beacons that detected probing signals originating from telecommunications devices in the defined area.

BRIEF DESCRIPTION OF THE DRAWINGS

The invention, together with further objects and advantages thereof, may best be understood by reference to the following description taken in conjunction with the accompanying drawings, wherein like reference numerals identify like elements, and wherein.

DETAILED DESCRIPTION OF THE INVENTION

Figure 1:
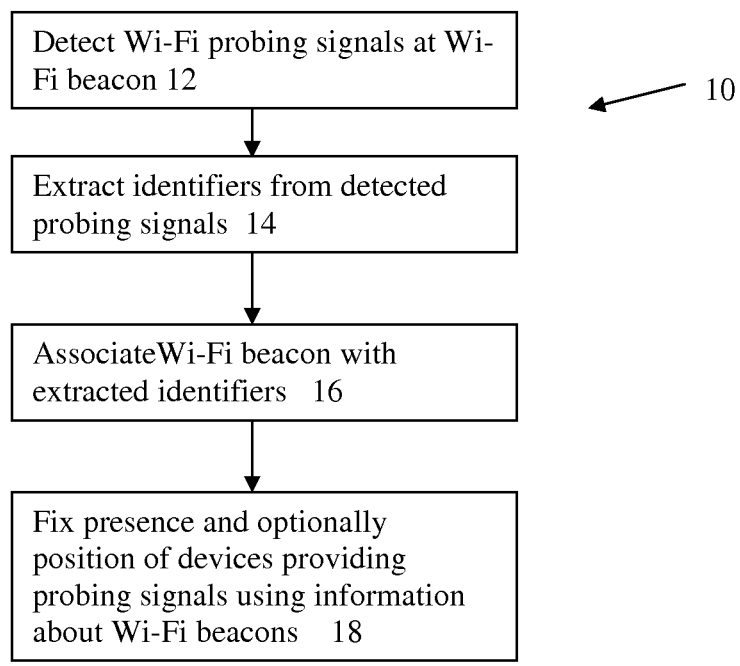
FIG. 1 shows a flow chart of a method in accordance with the invention for obtaining information about telecommunications devices.

Referring to the accompanying drawings wherein like reference numbers refer to the same or similar elements, FIG. 1 shows a flow chart of a basic method 10 in accordance with the invention for obtaining information about telecommunications devices that transmit signals seeking available Wi-Fi connectivity. Such signals are often known as probing signals. As a first step 12 in the method 10, one or more Wi-Fi beacons are configured to detect probing signals from any telecommunications device in its defined range. The Wi-Fi beacons may be considered nodes. This detection is possible because the Wi-Fi beacons inherently listen for probing signals emitted by Wi-Fi-enabled telecommunications devices when operational. The Wi-Fi beacons may be at fixed positions whose positional coordinates are known, at least when the method is implemented.

The next step 14 is to extract at each Wi-Fi beacon, an identifier of each telecommunications device from any detected probing signals. This extraction step 14 is performed at the Wi-Fi beacon. The identifier may be in any known format of identifiers for telecommunications devices, with each telecommunications device having a unique identifier. The Wi-Fi beacons may be configured with a defined range or detection threshold, i.e., the identification of only telecommunications devices within a specific distance or that have a signal strength above a threshold are extracted. Thus, the number of identifications provided by a Wi-Fi beacon may be less than the number of telecommunications devices capable of being detected. As used herein, a detected telecommunications device by a Wi-Fi beacon will generally mean a telecommunications device that satisfies a distance or signal strength threshold.

At this stage, the identifier provided by the telecommunications device may be associated with a more specific identification relating to the telecommunications device, such as the name of the user of the telecommunications device. This association may occur by manual entry of the name of the user by a computer program that controls the Wi-Fi beacon, or reference to a database in which previously manually entered information is stored. The computer program may be resident in a computer or other processing unit that is connected to the beacon, and the database. After the beacon detects each telecommunications device, a user input screen may be generated that asks for input of the name of the user of the detected telecommunications device in order to register the telecommunications device with the system, and optionally a description of the telecommunications device (for use, for example, when the same user has more than one telecommunications device). The computer program generates the user input screen, monitors the user input and then associates the telecommunications device identifier with the user-input identification information, and directs this information to the database.

Thereafter, in step 16, each Wi-Fi beacon is associated with the identifier of any telecommunications devices whose probing signals have been received by that Wi-Fi beacon to thereby enable the presence of any telecommunications devices within the range of the Wi-Fi beacon to be determined, step 18, for example, by the processor associated with the beacon. This information may be retrieved by a computer program that generates, manages and maintains a database identifying beacons, preferably each beacon's location, and any telecommunications device detected by the beacons. The computer program may be resident at storage media in a common unit with the processor associated with the beacon. The following table shows the manner in which such information may be displayed:

| Beacon/Node Identification | Beacon/Node Location | Detected Telecommunications Devices |
|---|---|---|
| 0001 | 2 Penn Plaza, New York, NY 10121 | Marian G., Carmelo A., Kenyon M. |
| 0007 | River Avenue and East 161$^{st}$, Bronx, NY 10451 | Derek J., Mariano R., Wade B., Don M. |
| 0014 | 123-01 Roosevelt Ave, Corona, NY 11368 | David W., Marlon B., Ruben T. |

Such a table is not required to be created but rather the information may be maintained in a database in whatever format is used for data storage. The database may be accessed by the processor associated with the beacon, or a central monitoring facility, to determine which people are around a specific location (location search to obtain telecommunication device users), or where a particular individual is (person search to obtain their location).

Use of the invention for corporations would be beneficial because by locating a Wi-Fi beacon in each corporate store, e.g., each coffee shop in a chain of coffee shops, the corporations would be able to compile a list of the users in and around their coffee shops. The lists may be analyzed for numerous reasons, e.g., targeted marketing, rewards programs, and the like.

In addition to the presence of the telecommunications device, the position of the telecommunications device may also be determined or more specifically calculated, especially if presence determination of the same telecommunications device is detected at multiple Wi-Fi beacons. That is, if more than one Wi-Fi beacon detects the presence of the same identifier of a telecommunications device, computational means, such as triangulation, may be used to determine the precise position of the telecommunications device. Additional or alternative techniques to determine the position of a telecommunications device whose probing signal has been detected by a Wi-Fi beacon is to approximate the position of the telecommunications device relative to the Wi-Fi beacon based on strength of the probing signal, and to approximate the absolute position of the telecommunications device based on the strength of the probing signal detected by the Wi-Fi beacon and a known position of the Wi-Fi beacon. The strength of the probing signal is often proportional to the distance between the Wi-Fi beacon and the telecommunications device. These techniques may be implemented by a computer program on storage media resident at a common housing with the processor associated with the Wi-Fi beacon, e.g., a computer that is connected to the Wi-Fi beacon.

An important aspect of the invention is that the telecommunications devices are not involved in the method other than providing in their usual manner of operation, probing signals containing identifiers, i.e., they do not have to be programmed to emit any special signals or include any special programming to enable their functionality with the techniques described herein. For example, a responsive signal from the Wi-Fi beacon to the telecommunications device is not necessary to establish the presence and optionally position of the telecommunications device. It is not necessary to exchange communications between the beacon and the telecommunications device. Moreover, cell phone towers and other infrastructure used to transmit and receive telecommunications signals between telecommunications devices, whether voice or data, are also not needed in the invention.

Each Wi-Fi beacon can be configured as a node to monitor a plurality of channels over which telecommunications devices are able to transmit probing signals. Preferably, each Wi-Fi beacon is configured to continuously monitor the plurality of channels. Thus, the Wi-Fi beacon listens for probing signals on one or more channels that are used for such transmissions. Preferably, each Wi-Fi beacon may be configured to listen for probing signals on all possible channels.

By determining the presence of a specific telecommunications device in the range of a Wi-Fi beacon, it becomes possible to monitor movement of the telecommunications device by analyzing variations in strength of the probing signals being detected by the Wi-Fi beacons, since the signal strength typically changes during movement. This monitoring may be accomplished by the processor associated with the Wi-Fi beacon or by a remote processor coupled to the processor of the Wi-Fi beacon. Variations in strength may be correlated to distance from the Wi-Fi beacon, i.e., when the telecommunications device is closer to the Wi-Fi beacon, the signal strength of the probing signal is greater than when the telecommunications device is more distant from the Wi-Fi beacon. By configuring a Wi-Fi beacon to continuously monitor the plurality of channels, changes in position of the telecommunications devices are obtained in real-time. This is possible because Wi-Fi-enabled telecommunications devices usually transmit probing signals at a frequency of about 1 time every 30 seconds.

Thus, the mere reception of a probing signal from a Wi-Fi enabled telecommunications device may be used to determine not only the presence of that device in the range of the beacon but also the absolute and/or relative position of the device. The Wi-Fi beacon or the computer associated therewith may generate and store data about identifiers of telecommunications devices whose probing signals have been detected, and provide its identification with the identifiers of such telecommunications devices to a remote location. At this location, the information about the telecommunications device, along with location information about the Wi-Fi beacon provided by the Wi-Fi beacon or derived from the transmission therefrom, is used for a variety of different applications. A processor at the remote location communicates with the processor associated with the Wi-Fi beacon in any conventional manner, e.g., using the Internet.

The applications of the method 10 and techniques described above are seemingly endless. In general, based on the detected presence and optionally position of telecommunications devices, one or more actions may be taken to react or respond to the detection. The reaction or response may be conditional, i.e., if certain telecommunications devices are detected, the reaction or response takes one form and if other telecommunications devices are detected, the reaction or response takes a different form.

In one application, once the presence and optionally position of telecommunications devices is known, a map may be generated by a computer program for presentation on a display connected to the computer. The map may include known structures and then the indication of the presence of each telecommunications device, with an identification thereof, e.g., the name of the user of the telecommunications device. For example, at a trade show, the arrangement of the aisle and booths of the trade show may form the base of the map and then a dot is superimposed on this map at the calculated position of the telecommunications device with an indication of the name of the user of the telecommunications device.

In another application, a number of telecommunications devices passing in a vicinity of a Wi-Fi beacon in a set time period is determined by determining a number of non-repeating identifiers of telecommunications devices whose probing signals are detected by the Wi-Fi beacon. This may be useful to count people in numerous situations, for example, passing by a retail store, in a crowd, in an airport, in a mall, etc.

Figure 2:
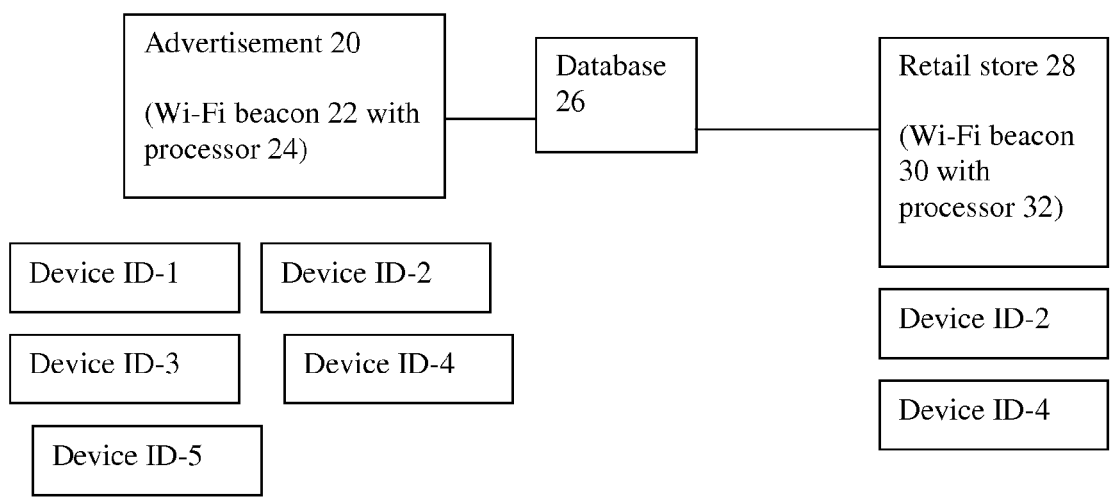
FIG. 2 is a schematic of a first exemplifying, non-limiting application of use of the invention.

Another application, depicted in FIG. 2, is to assess efficacy of advertising for a physical establishment such as a retail store 28 by placing a first Wi-Fi beacon 22 in a vicinity of an advertisement 20 for the establishment 28, creating a database 26 of identifiers of telecommunications devices (devices-ID-1, 2, 3, 4, 5) whose probing signals are detected by the first Wi-Fi beacon 22, which may be performed by a processor 24 of the first Wi-Fi beacon 22, and placing a second Wi-Fi beacon 30 in or in a vicinity of the establishment 28, i.e., inside the store. With this configuration, it is possible to analyze whether identifiers of telecommunications devices whose probing signals are detected by the second Wi-Fi beacon 30 have been previously detected by the first Wi-Fi beacon 22, e.g., by a processor 32 of the second Wi-Fi beacon 30. In the illustrated example, only Devices-ID-2, 4 are detected by Wi-Fi beacon 30 at the establishment 28. Thus, only 2 of the 5 people exposed to the advertisement 20 followed through and came to the establishment 28.

Even further, two Wi-Fi beacons may be arranged at the store, one at the entrance to detect people entering, and one at the cashier to detect people purchasing. In this case, further detailed assessment of the effectiveness of the advertisement 20 can be obtained by determining how many people respond to the advertisement 20 and enter the store and how many of the people entering the store purchase something, whether the advertised product or something else.

Figure 3:
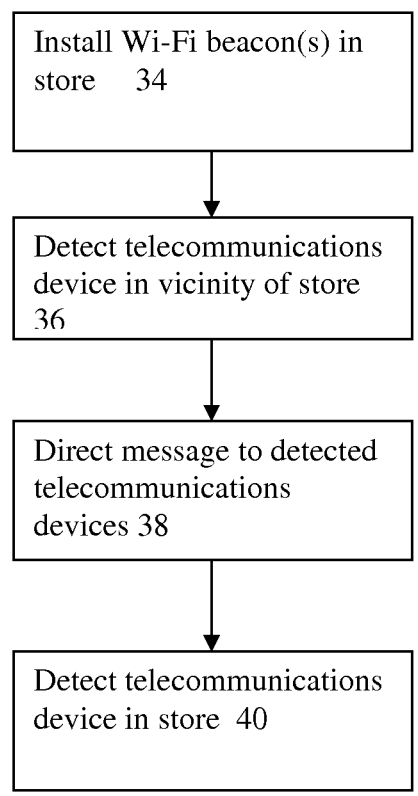
FIG. 3 is a flow chart of a second exemplifying, non-limiting application of use of the invention.

In another application of the invention outlined in FIG. 3, a coupon or other type of advertisement for a commercial establishment, e.g., a store, may be directed to telecommunications devices determined to be within a threshold distance of the store. Initially, for this application, one or more Wi-Fi beacons are installed in or around the store, step 34, to be able to detect telecommunications devices within the desired distance from the store, e.g., 100 feet, step 36. The system is operated by a processor, or computer, coupled to the Wi-Fi beacon and as the Wi-Fi beacon detects telecommunications devices in step 36, processor directs messages to detected telecommunications devices, step 38, each message including a coupon or other inducement to enter the store and purchase goods or services offered for sale. A computer program operating in conjunction with the processor may be designed to direct messages via a transmission or communications unit, possibly the Wi-Fi beacon itself, only to registered telecommunications devices, i.e., telecommunications devices whose users have provided identification information and an indication of willingness to receive advertisements for the specific store. The telecommunications device indicates receipt of a message, ideally while the person is still within the vicinity of the store, which may prompt the person to enter the store and purchase goods or services, whether subject to the advertisement or otherwise. For analysis purposes, the Wi-Fi beacon can also be used to detect if the person has entered the store, step 40, e.g., monitoring the position of the telecommunications device reveals whether its position has changed to be closer to the Wi-Fi beacon, which would be a good indication of entry of the person into the store.

Figure 4:
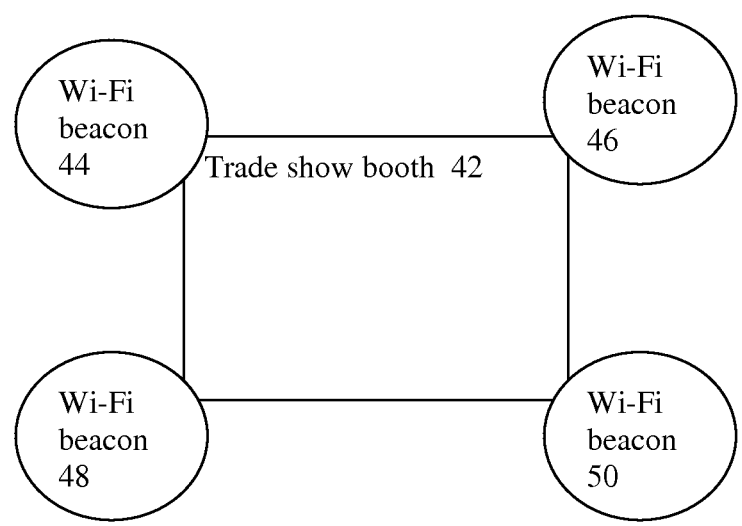
FIG. 4 is a schematic of a third exemplifying, non-limiting application of use of the invention.

Referring now to FIG. 4, in another embodiment of the invention, traffic in a particular or defined area may be monitored, e.g., at or around a booth 42 of a trade show. In this embodiment, one or more of Wi-Fi beacons 44, 46, 48, 50 are arranged to detect probing signals originating from telecommunications devices in or around the booth 42. The number of people in or around the trade show booth 42 is analyzed by determining a number of non-repeating identifiers of telecommunications devices whose probing signals are detected by the Wi-Fi beacons 44, 46, 48, 50 that detected probing signals originating from telecommunications devices in or around the trade show booth 42. This greatly simplifies and improves the ability to count visitors to a trade show booth 42 or other site of interest.

In yet another embodiment in which a conditional response is undertaken, the Wi-Fi beacon may be installed and used as an authorization device to regulate entry through a gate or door. In this embodiment, a Wi-Fi beacon is installed at or proximate to the gate, door or other entry, and detects telecommunications devices in its proximity. The Wi-Fi beacon is coupled to an automatic unlocking or opening mechanism including a processor or comparable data processing unit. The automatic unlocking or opening mechanism unlocks the gate or door or opens the gate or door only when the detected telecommunications device meets conditions for entry through the gate or door. For example, a list of authorized people may be maintained along with identifications of their telecommunications devices, so that when a person approaches the Wi-Fi beacon, the Wi-Fi beacon detects their telecommunications device, accesses the list to ascertain whether the user of the telecommunications device is on the list and only if so, directs the mechanism to unlock and open the gate or door. If the user of the telecommunications device is not on the list, the Wi-Fi beacon does not direct opening or unlocking of the gate or door, and alternatively may sound an alarm. Moreover, the processor may consider signal strength to unlock or open door the gate or door to ensure that the person is in close proximity to the gate or door, i.e., only when the signal strength is above a threshold indicative of close proximity to the gate door does the gate or door unlock or open. This technique enables telecommunications devices to be used as security badges, relying on the assumption that the telecommunications device is in possession of its rightful owner.

In a similar manner, the Wi-Fi beacon can detect when the telecommunications device no longer provides measurable signal strength above the threshold, indicative of movement away from the gate or door. The Wi-Fi beacon can provide this change in position information to the processor which could then lock or close the gate or door.

Although the various applications of the invention described above are useable solely based on detection of a telecommunications device by Wi-Fi beacons, it is preferable, as mentioned several times above, for the telecommunications devices to be registered with the system. Registration enables association of telecommunications device identifiers with the names of their owners/users and possibly other personal information about the owners/users. Such information will aid in the generation of messages containing coupons to the telecommunications, for the embodiment described above with reference to FIG. 3. It will also aid in searching for a specific user by name.

The foregoing techniques to identify a telecommunications device are operable simply by virtue of the telecommunications device being used in a Wi-Fi connectivity mode wherein it continually sends out probe signals to search for available Wi-Fi beacons. Thus, the invention does not require the telecommunications device to use radio frequency identification (RFID) techniques or near field communication (NFC) techniques.

Figure 5:
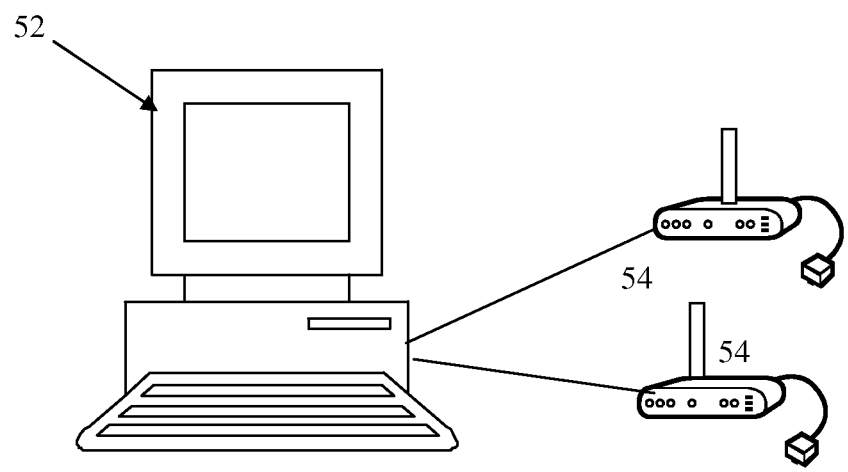
FIG. 5 shows a system that can implement the invention, and execute the computer programs in accordance with the invention.

Referring finally to FIG. 5, the environment in which the techniques described above may be implemented is basically with a computer 52 and two Wi-Fi beacons 54 connected to the computer 52. Although two Wi-Fi beacons 54 are shown, one or more than two Wi-Fi beacons may be connected to the same computer 52. The computer 52 includes one or more user interfaces, e.g., a mouse, keyboard and the like, and a display. The user interfaces enable entry of the identification information of the user into a memory component associated with the computer 52 when their telecommunications device is detected and an input screen is displayed on the display, i.e., to facilitate the registration process. The display of the computer 52 is also used to show the map of the area around the Wi-Fi beacon(s) 54 and the position of detected telecommunications devices within that area. The computer 52 includes usual computer hardware and software, including one or more data storage/memory devices wherein computer programs are stored. These computer programs may be any of those disclosed herein. Instead of a computer 52 having the form shown in FIG. 5, any type of processing unit may be used to implement the method and system in accordance with the invention, including, e.g., a laptop, notebook, tablet, a PALM-type unit, and the like.

The foregoing techniques may be applied by a computer program executed by the processor of the computer 52 and associated with the Wi-Fi beacon(s) 54, from any type of computer-readable medium onto which computer software is embodied. When executed, the computer program is configured to cause one or more of the Wi-Fi beacons 54 to monitor channels for probing signals from telecommunications devices, extract an identifier of each telecommunications device from detected probing signals, associate with the identifier of any telecommunications devices whose probing signals have been received by that Wi-Fi beacon with the Wi-Fi beacon, and then provide an identification of the Wi-Fi beacon with the identifiers of telecommunications devices whose probing signals have been received by that Wi-Fi beacon to the computer 52. These identification associations may be stored in a memory component associated with the computer 52, and provided on the display or output in another form, e.g., transmitted to a remote unit, when desired or upon command by monitoring personnel. The identification associations do not have to be displayed or output but rather may be simply be accessed by a computer program when it is desired to use the information for, for example, advertising, security purposes, etc. The computer program thereby determines presence of any telecommunications devices within the range of the Wi-Fi beacon. The computer program may also be configured to enable registration of the telecommunications devices, e.g., provide a screen on the display for manual entry of the user's name to associate with the telecommunications device.

Instead of or in addition to providing the identification of telecommunications devices to the computer 52, the computer program may provide the identification to a computer associated with or communicatively coupled to the Wi-Fi beacon, but at a remote location. The remote location may be, for example, a computer at any site or facility that is interested in knowing how many people having active telecommunications devices are within range of the Wi-Fi beacon, as counted by the number of non-repeating identifiers extracted by the computer program at the Wi-Fi beacon.

Even further, the computer program executed by the computer 52 may be designed to convey, through a telecommunications network or wired network (the hardware and software for which may be incorporated into the computer 52), the identifiers of the telecommunications devices whose probing signals were detected. A reverse directory may be used to obtain, from the identifiers, identification information for the purpose of, for example, directing advertisements to the telecommunications device which might be interest to the user, as determined by known interests or the area in which the telecommunications device is situated (see FIG. 3 described above). A person determined to be proximate a specific store might be directed an advertisement for that store. More specifically, a person know to like sports might be directed an advertisements for sports equipment at a nearby sports store.

All of these possibilities are obtained simply by detecting the probing signal from a Wi-Fi enabled device at a Wi-Fi beacon and at the beacon, processing the probing signal.

Additional enhancements to the computer program include the capability of determining a position of a telecommunications device whose probing signal has been detected, in any of the ways described above, and monitoring movement of the telecommunications device by analyzing variations in strength of the probing signals being detected.

In the context of this document, computer-readable medium could be any means that can contain, store, communicate, propagate or transmit a program for use by or in connection with the method, system, apparatus or device. The computer-readable medium can be, but is not limited to (not an exhaustive list), electronic, magnetic, optical, electromagnetic, infrared, or semi-conductor propagation medium. The medium can also be (not an exhaustive list) an electrical connection having one or more wires, a portable computer diskette, a random access memory (RAM), a read-only memory (ROM), an erasable, programmable, read-only memory (EPROM or Flash memory), an optical fiber, and a portable compact disk read-only memory (CDROM). The medium can also be paper or other suitable medium upon which a program is printed, as the program can be electronically captured, via for example, optical scanning of the paper or other medium, then compiled, interpreted, or otherwise processed in a suitable manner, if necessary, and then stored in a computer memory. Also, a computer program or data may be transferred to another computer-readable medium by any suitable process such as by scanning the computer-readable medium.

While particular embodiments of the invention have been shown and described, it will be obvious to those skilled in the art that changes and modifications may be made without departing from the invention in its broader aspects, and, therefore, the aim in the appended claims is to cover all such changes and modifications as fall within the true spirit and scope of the invention.

The invention claimed is:

1. A method for obtaining information about telecommunications devices that transmit signals seeking available Wi-Fi connectivity, comprising:
configuring each of a plurality of Wi-Fi beacons to detect probing signals from any telecommunications device in its range, each of the probing signals containing an identifier of the telecommunications device that is sending the probing signal;
extracting at each Wi-Fi beacon from probing signals detected by the Wi-Fi beacon, an identifier of at least one telecommunications device whose probing signals have been detected by the Wi-Fi beacon;
associating each Wi-Fi beacon with the identifier of any telecommunications devices whose probing signals have been detected by that Wi-Fi beacon to thereby determine the presence of any telecommunications devices within the range of the Wi-Fi beacon;
determining, at at least one of the Wi-Fi beacons, a position of a telecommunications device whose probing signal has been detected by that Wi-Fi beacon; and
generating a map of an area within range of at least one of the Wi-Fi beacons on a display apart from any telecommunications devices whose probing signals have been detected by the at least one of the Wi-Fi beacons, and indicating the position of the telecommunications device on the map relative to the position of the at least one of the Wi-Fi beacons,
whereby the telecommunications devices are not involved in the method other than providing in their usual manner of operation, probing signals containing identifiers.

2. The method of claim 1, wherein the step of determining the position of the telecommunications device whose probing signal has been detected by the Wi-Fi beacon comprises approximating the position of the telecommunications device relative to the Wi-Fi beacon based on strength of the probing signal that has been detected by the Wi-Fi beacon.

3. The method of claim 1, wherein the step of determining the position of the telecommunications device whose probing signal has been detected by the Wi-Fi beacon comprises approximating the absolute position of the telecommunications device based on strength of the probing signal that has been detected by the Wi-Fi beacon and a known position of the Wi-Fi beacon.

4. The method of claim 1, further comprising monitoring movement of the telecommunications device by analyzing variations in strength of the probing signals front the telecommunications device being detected by at least one of the Wi-Fi beacons.

5. The method of claim 1, further comprising controlling a device based on the determined presence of any telecommunications devices within the range of at least one of the Wi-Fi beacons.

6. The method of claim 5, wherein the device is an entry control mechanism that unlocks, opens, closes and/or locks a gate or door.

7. The method of claim 1, wherein at least one of the Wi-Fi beacons is installed at or proximate a commercial establishment, further comprising directing a message containing an advertisement or coupon relating to the commercial establishment to at least one detected telecommunications device within the range of the at least one of the Wi-Fi beacons.

8. The method of claim 1, further comprising determining a number of telecommunications devices passing in a vicinity of at least one of the Wi-Fi beacons in a set time period by determining a number of non-repeating identifiers of telecommunications devices whose probing signals are detected by the at least one of the Wi-Fi beacons.

9. The method of claim 1, further comprising assessing efficacy of advertising for a physical establishment by:
placing a first one of the Wi-Fi beacons in a vicinity of an advertisement for the establishment;
creating a database of identifiers of telecommunications devices whose probing signals are detected by the first Wi-Fi beacon;
placing a second one of the Wi-Fi beacons in or in a vicinity of the establishment; and
analyzing whether identifiers of telecommunications devices whose probing signals are detected by the second Wi-Fi beacon have been previously detected by the first Wi-Fi beacon;

whereby the results of the analysis are provided in a notification to an entity interested in the efficacy of the advertising.

10. The method of claim 1, further comprising:
arranging one or more of the Wi-Fi beacons to detect probing signals originating from telecommunications devices in a defined area; and
analyzing a number of people in the defined area by determining a number of non-repeating identifiers of telecommunications devices whose probing signals are detected by the one or more of the Wi-Fi beacons that detected probing signals originating from telecommunications devices in the defined area,
whereby the results of the analysis are provided to an entity interested in the number of people in the defined area.

11. A system for obtaining information about telecommunications devices that transmit signals seeking available Wi-Fi connectivity, comprising:
a plurality of Wi-Fi beacons, each configured to detect probing signals from any telecommunications device in its range, each of the probing signals containing an identifier of the telecommunications device that is sending the probing signal;
a processor associated with each Wi-Fi beacon and that is configured to extract from probing signals detected by the associated Wi-Fi beacon, an identifier of each telecommunications device whose probing signals have been detected by the associated Wi-Fi beacon and associate the identifier of any telecommunications devices whose probing signals have been detected by the associated Wi-Fi beacon to the Wi-Fi beacon to thereby determine the presence of any telecommunications devices within the range of the associated Wi-Fi beacon;
a position determining system that determines a position of a telecommunications device whose probing signal has been detected by the associated Wi-Fi beacon; and
a map generating system that generates a map of an area within range of at least one of the Wi-Fi beacons on a display apart from any telecommunications devices whose probing signals have been detected by the at least one of the Wi-Fi beacons and indicates the position of the telecommunications device, as determined by the position determining system, on the map relative to the position of the at least one of the Wi-Fi beacons.

12. The system of claim 11, wherein said position determining system is configured to determine the position of the telecommunications device whose probing signal has been detected by the associated Wi-H beacon by approximating the position of the telecommunications device relative to the Wi-Fi beacon based on strength of the probing signal has been detected by the Wi-Fi beacon.

13. The system of claim 11, wherein said position determining system is configured to determine the position of the telecommunications device whose probing signal has been detected by the Wi-Fi beacons by approximating the absolute position of the telecommunications device based on strength of the probing signal detected by the Wi-Fi beacon and a known position of the Wi-Fi beacon.

14. The system of claim 11, wherein said processor is further configured to monitor movement of the telecommunications device by analyzing variations in strength of the probing signals being detected by the associated Wi-Fi beacon.

15. The system of claim 11, wherein said processor is further configured to determine a number of telecommunications devices passing in a vicinity of at least one of the Wi-Fi beacons in a set time period by determining a number of non-repeating identifiers of telecommunications devices whose probing signals are detected by the associated Wi-Fi beacon.

* * * * *